US011721005B2

(12) United States Patent
Kato et al.

(10) Patent No.: US 11,721,005 B2
(45) Date of Patent: Aug. 8, 2023

(54) AUTOMOBILE USE VIDEO IMAGE RECORDING DEVICE AND AUTOMOBILE USE GRAPHICAL IMAGE RECOGNITION DEVICE

(71) Applicant: Mitsubishi Electric Corporation, Tokyo (JP)

(72) Inventors: Yoichi Kato, Tokyo (JP); Nariaki Takehara, Tokyo (JP); Takuya Taniguchi, Tokyo (JP); Kunio Ueda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/263,299

(22) PCT Filed: Aug. 31, 2018

(86) PCT No.: PCT/JP2018/032355
§ 371 (c)(1),
(2) Date: Jan. 26, 2021

(87) PCT Pub. No.: WO2020/044535
PCT Pub. Date: Mar. 5, 2020

(65) Prior Publication Data
US 2021/0295481 A1    Sep. 23, 2021

(51) Int. Cl.
*G06T 5/50* (2006.01)
*B60R 11/04* (2006.01)
(Continued)

(52) U.S. Cl.
CPC .............. *G06T 5/50* (2013.01); *B60R 11/04* (2013.01); *G06V 20/56* (2022.01); *H04N 23/58* (2023.01);
(Continued)

(58) Field of Classification Search
CPC .... G06T 5/50; H04N 5/2259; H04N 5/23229; H04N 5/23238; H04N 5/247; B60R 11/04
See application file for complete search history.

(56) References Cited

U.S. PATENT DOCUMENTS

2005/0216144 A1* 9/2005 Baldassa ............... G07C 5/008
701/24
2013/0329045 A1    12/2013 Choi

FOREIGN PATENT DOCUMENTS

DE    102016009702    *    2/2017
JP    2005-280526 A    10/2005
(Continued)

OTHER PUBLICATIONS

International Search Report for PCT/JP2018/032355 dated Nov. 6, 2018 (PCT/ISA/210).
(Continued)

*Primary Examiner* — Kathleen V Nguyen
(74) *Attorney, Agent, or Firm* — Sughrue Mion, PLLC; Richard C. Turner (57) ABSTRACT

In a video image recording device, when a scene outside of a vehicle is recorded through a wind shield, a scene on the inside of a vehicle room is reflected by the wind shield and reflection glare is produced. In order to reduce the influence of this reflection glare, the video image recording device is provided with a video image capture device which obtains a first data on a general video image and a second data on a predetermined part in a vehicle room, wherein the general video image is with a reflection video image, of the predetermined part and also with a transmission video image, a graphical image conversion device which converts the second data into a third data, the third data corresponding to a reflection video image by the wind shield, and a graphical image correction device which corrects the first data based on the third data.

14 Claims, 10 Drawing Sheets

(51) Int. Cl.
　　　*G06V 20/56*　　　(2022.01)
　　　*H04N 23/58*　　　(2023.01)
　　　*H04N 23/90*　　　(2023.01)
　　　*H04N 23/695*　　(2023.01)
　　　*H04N 23/698*　　(2023.01)
　　　*B60R 11/00*　　　(2006.01)

(52) U.S. Cl.
　　　CPC ......... *H04N 23/695* (2023.01); *H04N 23/698* (2023.01); *H04N 23/90* (2023.01); *B60R 2011/0003* (2013.01); *G06T 2207/30252* (2013.01)

(56) References Cited

FOREIGN PATENT DOCUMENTS

| JP | 2005280526 | * | 10/2005 |
| JP | 2006-086784 A | | 3/2006 |
| JP | 2006086784 | * | 3/2006 |
| JP | 2009-255722 A | | 11/2009 |
| JP | 2013-258677 A | | 12/2013 |
| JP | 5417773 B2 | | 2/2014 |
| JP | 2016-127470 A | | 7/2016 |

OTHER PUBLICATIONS

Communication dated Nov. 10, 2021, issued by the National Intellectual Property Office of the P.R.C. in application No. 201880096858.9.

Communication dated Feb. 8, 2022, issued by the Japanese Patent Office in JP Patent Application No. 2020-539983.

* cited by examiner

AUTOMOBILE USE VIDEO IMAGE RECORDING DEVICE AND AUTOMOBILE USE GRAPHICAL IMAGE RECOGNITION DEVICE

CROSS REFERENCE TO RELATED APPLICATIONS

This application is a National Stage of International Application No. PCT/JP2018/032355 filed Aug. 31, 2018.

FIELD OF THE INVENTION

The present disclosure relates to an automobile use video image recording device, and an automobile use graphical image recognition device.

BACKGROUND OF THE INVENTION

Automobile use video image recording devices for recording a video image of the circumference of a host vehicle are attached on the upper part of a driver seat in a vehicle room, so that the video image can be recorded through a front wind shield (front glass). However, a dashboard on the inside of a car is illuminated by the light from the outside of a car body and produces a reflection on the surface of a front wind shield, and thereby, there arises a problem that reflection glare is taken into a video image capture device. In order to prevent the production of this reflection glare, a variety of automobile use video image recording devices are proposed.

One of such devices is a setup in which a linearly polarized light filter is provided on an optical path of the reflection glare which is taken into a video image pickup lens of an automobile use video image recording device. To be more precise, a device is proposed in which a linearly polarized light filter is attached on the lower part of a video image pickup lens (Patent Document 1). However, when a linearly polarized light filter is attached on the lower part of a video image pickup lens, there arises a problem that the driver's field of view is obstructed.

In order to solve this problem, proposed is a structure in which a filter having a function of an optical switch is disposed on a front wind shield. This filter is a device designed so that a general video image can be recorded through a front wind shield, when the filter is in a turned off state, and further, so that a reflection video image by the front wind shield can be recorded, when the filter is in a turned on state. According to this proposal, a difference video image is created by deducting the reflection video image, from the general video image which is recorded with a camera, using the filter, and correction is carried out on the general video image based on this difference video image to obtain a final video image (Patent Document 2).

However, in the case where this proposal is implemented, the filter must be disposed on the outside of a front wind shield, since a reflection video image on the indoor side of the front wind shield needs to be obtained. Additionally, there arises a problem that a configuration for establishing the link with a camera becomes complicated, and further, the filter obstructs the movement of a wiper which is provided on the outside of the front wind shield.

CITATION LIST

Patent Literature

Patent Document 1: Japanese Patent No. 5417773
Patent Document 2: Japanese Laid-Open Patent Publication No. 2013-258677

SUMMARY OF THE INVENTION

Technical Problem

In connection with the fact that a reflection video image is included in a general video image which is obtained through a front wind shield, there is an issue that influence of the reflection glare of a reflection video image cannot be eliminated, without obstructing the driver's field of view.

The present disclosure aims at providing an automobile use video image recording device which does not obstruct the driver's field of view and is made to be less sensitive to the influence of a reflection video image.

Solution to Problem

An automobile use video image recording device according to the present disclosure includes: a video image capture device which obtains a first graphical image data on a general video image and a second graphical image data on a predetermined part in a vehicle room, wherein the general video image is with a reflection video image by a wind shield, of the predetermined part in the vehicle room and also with a transmission video image that transmitted through the wind shield, a graphical image conversion device which converts the second graphical image data into a third graphical image data, the third graphical image data corresponding to a reflection video image by the wind shield, and a graphical image correction device which corrects the first graphical image data based on the third graphical image data.

Advantageous Effects of Invention

According to the present disclosure, since the graphical image data on a general video image is corrected by graphical image processing which uses a graphical image data corresponding to a reflection video image, the reflection glare can be made to have smaller amounts of influence.

DESCRIPTION OF EMBODIMENTS

Embodiment 1

Figure 1:
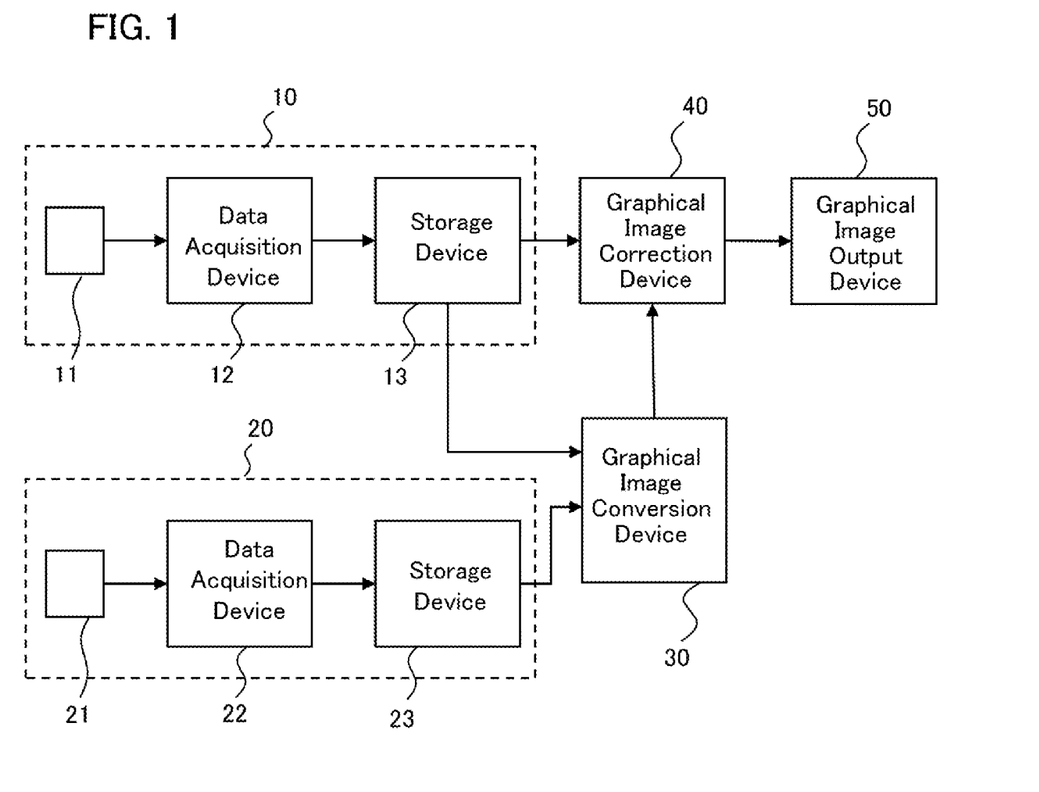
FIG. 1 is a block diagram which shows the configuration of an automobile use video image recording device according to Embodiment 1.

Automobile use video image recording devices for recording a video image of the circumference of a host vehicle are attached on the upper part of a driver seat in a vehicle room, so that the video image can be recorded through a front wind shield. As shown in FIG. 1, this automobile use video image recording device is provided with a first video image capture device 10 which obtains a first graphical image data on a general video image, wherein the general video image is with a transmission video image that transmitted through a wind shield and also with a reflection video image by a wind shield, of a predetermined part in a vehicle room; and a second video image capture device 20 which obtains a second graphical image data on a video image, of the predetermined part in the vehicle room, that became an object of the reflection video image. The first video image capture device 10 and the second video image capture device 20 are provided respectively with a camera 11 and a camera 21, a data acquisition device 12 and a data acquisition device 22, and a storage device 13 and a storage device 23.

The graphical image data which can be taken out from the first video image capture device 10 is a graphical image data on a general video image, which is a transmission video image on which a reflection video image is added. In addition, the graphical image data which can be taken out from the second video image capture device 20 is not a graphical image data on a reflection video image itself, but a graphical image data on a video image which can be obtained by recording a video image of a predetermined part that became an object of the reflection video image. That is to say, the camera 21 of the second video image capture device 20 is the one to record a video image of a predetermined part that became an object of the reflection video image.

The storage device 13 of the first video image capture device 10 and the storage device 23 of the second video image capture device 20 are connected to a graphical image conversion device 30. This graphical image conversion device 30 converts a second graphical image data which is taken out from the storage device 23, into a graphical image data which corresponds to a reflection video image (a third graphical image data). In order to bring the third graphical image data closer to the graphical image data on a reflection video image, the graphical image data on a general video image, which is stored in the storage device 13 of the first video image capture device 10, is required as a reference data. That is to say, in the graphical image conversion device 30, graphical image conversion technology is used to create a graphical image data on a reflection video image by a wind shield, from the second graphical image data by the second video image capture device 20.

For example, since the reflection video image is a video image which is reflected by a wind shield, the second graphical image data is reversed and is disposed on a flat surface, and the brightness information is converted to numerical values and those values are disposed on a plane coordinate. As for the first graphical image data, the brightness information is also converted to numerical values and those values are disposed on a plane coordinate. Similar regions are determined by similar image search technology, in which the similarity in the values of each brightness information (the third graphical image data, which is obtained by performing graphical image conversion to the second graphical image data, is similar to a part of the first graphical image data) is judged. Then, adjustment of the data can be performed, so that the third graphical image data may be brought closer to a part of the first graphical image data. It is to be noted that these operations perform the expansion and contraction of graphics and the adjustment of slopes, based on the brightness value and graphical image data. So, learning of the repetition for the adjustment can be performed, using a microprocessor, where parameters and coordinate axes in the adjustment are set up previously.

Further, the first video image capture device 10 is connected to a graphical image correction device 40. The graphical image correction device 40 corrects the first graphical image data which is taken out from the storage device 13, based on the third graphical image data, which underwent the conversion by the graphical image conversion device 30. Then, the first graphical image data which underwent the correction based on the third graphical image data (the first graphical image data after the correction) is output to a graphical image output device 50, and a video image in which a reflection video image is eliminated from a general video image, can be provided, as an output of the automobile use video image recording device.

Figure 2:
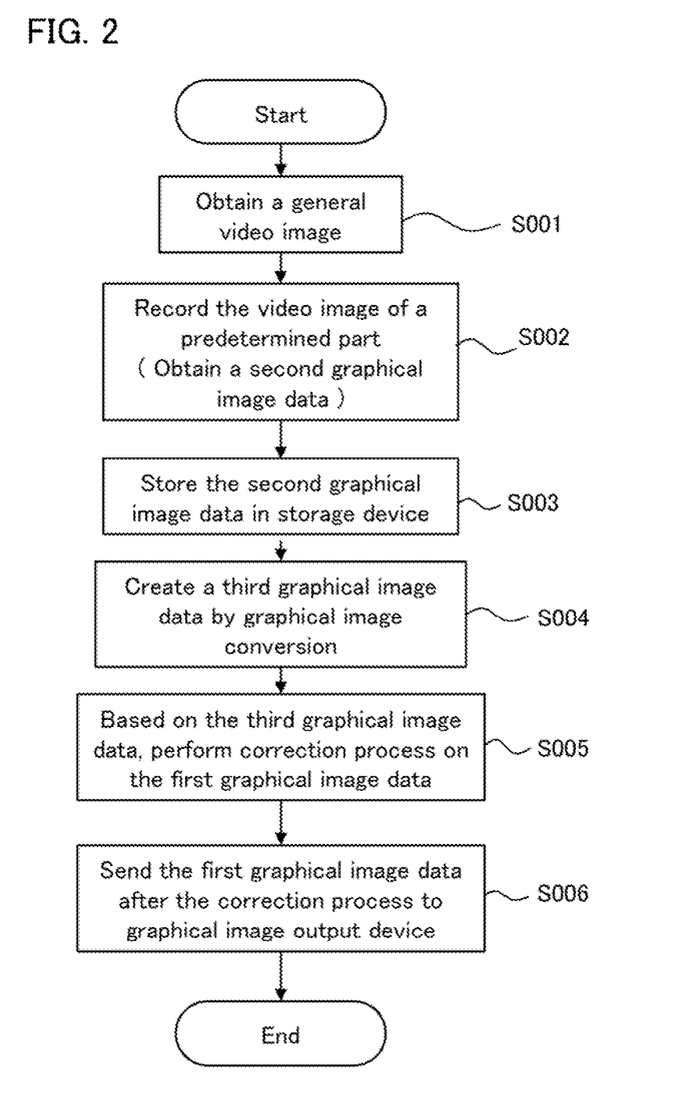
FIG. 2 is a flow chart which shows the operation of the automobile use video image recording device according to Embodiment 1.

Next, the operation of the automobile use video image recording device which is shown in FIG. 1 is represented on a flow chart, shown in FIG. 2.

At first, the graphical image data on a general video image (the first graphical image data on a general video image, wherein the general video image is with a transmission video image that transmitted through a wind shield and also with a reflection video image by the wind shield, of a predetermined part in a vehicle room) is obtained with a camera 11, in the first video image capture device 10 (Step S001). In the case where the present device is attached to, for example, a front wind shield of a vehicle, the first graphical image data which is obtained here is on a general video image, wherein the general video image is with a video image of the scenery ahead, including an object to which attention on the contact or collision along the travelling direction of a vehicle should be paid, and also with a reflection video image in a vehicle room.

In the second video image capture device 20, a video image of a predetermined part, which became an object of the reflection video image, is recorded with the camera 21 (Step S002). The graphical image data on the video image which is recorded here, is temporarily stored in the storage device 23, as a second graphical image data (Step S003).

Graphical image conversion is performed on a second graphical image data which is obtained by the second video image capture device 20, so that the second graphical image data may become a video image of the time when reflected by a wind shield, and a third graphical image data which has a huge similarity to a part of the first graphical image data is created (Step S004).

Further, the first graphical image data which is obtained by the first video image capture device 10 is sent to a graphical image correction device 40. The graphical image correction device 40 reads in the third graphical image data from the graphical image conversion device 30, and correction process by graphical image processing is performed on a corresponding part of the first graphical image data, based on the third graphical image data (Step S005).

Here, a method for performing specifically the correction process by graphical image processing on the third graphical image data, which corresponds to a graphical image with reflection glare, is for example as follows; a fixed quantity of correction is performed beforehand on RGB values or brightness values, or the both, with respect to respective pixels of a reflection glared graphical image, and then, the process for doing division from the graphical image data is performed.

After that, the first graphical image data in which a corresponding part of the third graphical image data is processed will be sent to the graphical image output device 50 (Step S006).

Figure 3:
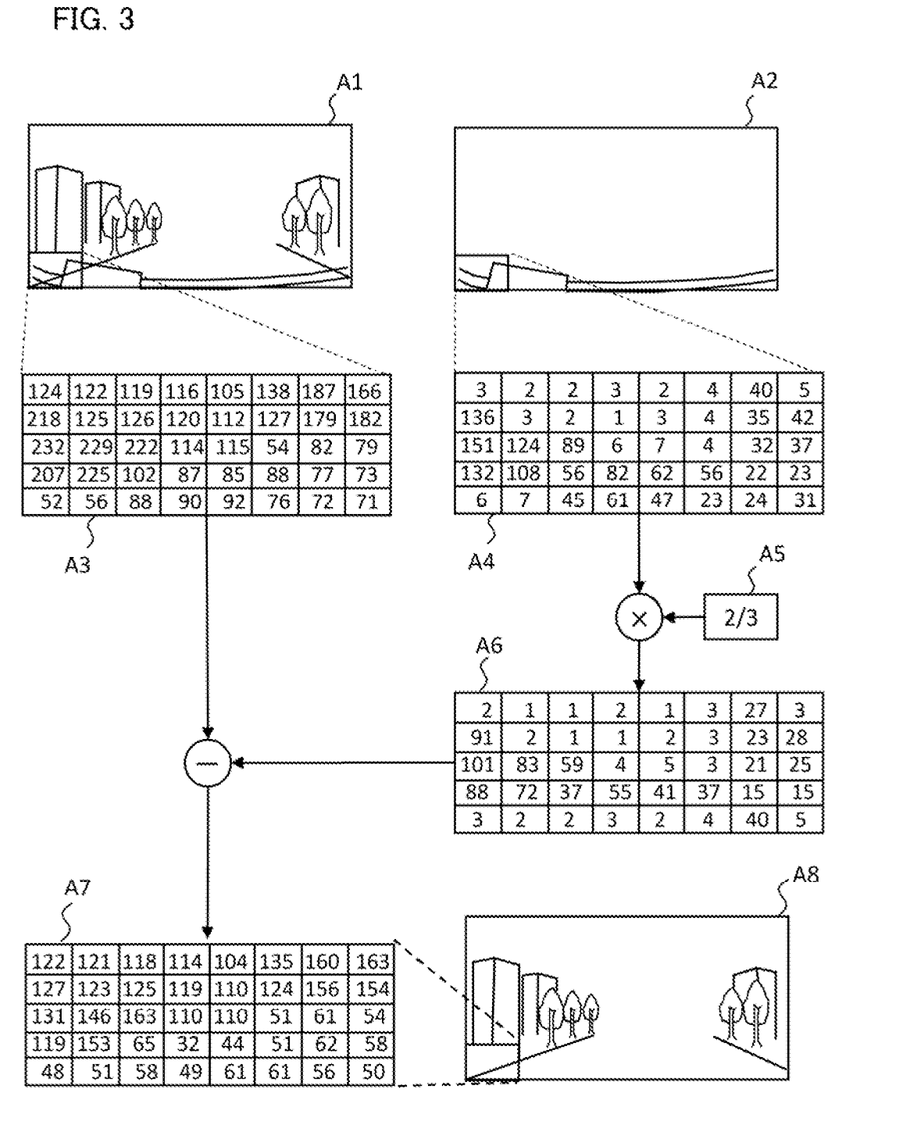
FIG. 3 is a drawing for explaining the graphical image processing by the automobile use video image recording device according to Embodiment 1.

Next, explanation will be made, based on FIG. 3, about the correction process which is handled in the graphical image correction device 40 and is performed on the first graphical image data, based on the third graphical image data. In the drawing, Graphical image A1 represents a graphical image of ahead of a vehicle, in other words, a general video image which becomes a first graphical image data. Graphical image A2 is a graphical image of reflection glare part only, and, that is to say, represents a reflection video image which corresponds to the third graphical image data. Further, Data A3 represents brightness values of respective pixels (the luminosity for 1 pixel of image element, which is represented in 0 to 255 level), in the case where the Graphical image A1 is enlarged.

Here, brightness values of only a portion of image elements in the Graphical image A1 are exemplary presented, for the sake of simplicity. In a similar manner, Data A4 represents brightness values of a portion of image elements in the Graphical image A2. Numeral A5 represents a correction value, which will be multiplied to the brightness values of image elements A3. Data A6 represents brightness values of after the correction, where the brightness values of image element A3 underwent the correction by the correction value A5. Furthermore, Data A7 represents brightness values, which are obtained by subtracting the brightness values A6 of a reflection glared graphical image (after the correction) from the brightness values A3 of the Graphical image A1. When those A7 values are employed to depict a graphical image, the graphical image from which reflection glare is eliminated, like Graphical image A8, is produced.

It is to be noted that a correction value A5 is introduced, since only subtracting the brightness values A4 simply from the brightness values A3 may not always eliminate the reflection glare, depending on the surrounding environment. For example, subtraction is carried out with a default setting for the correction value A5, and check on the degree of correction is performed by the Graphical image A8, which is a result of after this subtraction. Those checks are carried out repeatedly to set up an optimal correction coefficient.

Figure 4:
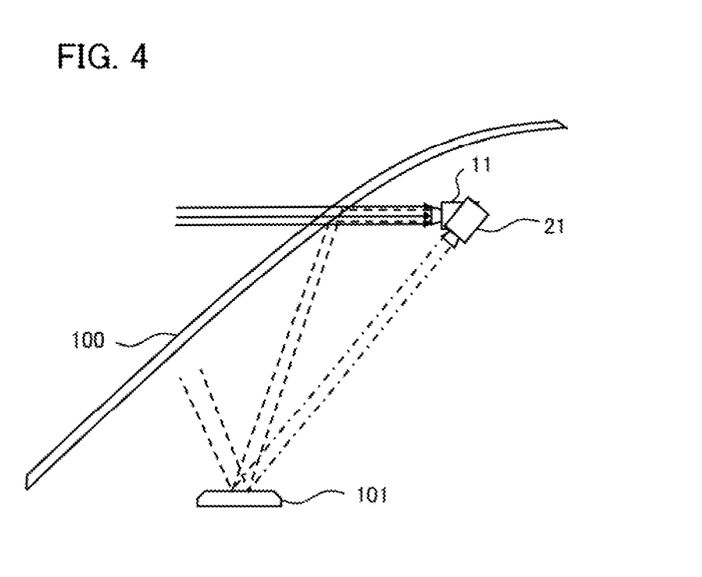
FIG. 4 is a configuration diagram for showing an exemplary installation of the automobile use video image recording device according to Embodiment 1.

FIG. 4 is a configuration diagram for showing an exemplary installation of the automobile use video image recording device according to this Embodiment 1. In this FIG. 4, there is shown a configuration viewed from the side face thereof, in which a front wind shield 100 of a vehicle and a dashboard part 101 that becomes an object of reflection glare are included. As shown in this FIG. 4, a camera 11 of the first video image capture device 10 is attached so as to record the video image of a scene ahead of a vehicle, through the front wind shield 100. In contrast, a camera 21 of the second video image capture device 20 is attached so as to record the video image of a dashboard part 101, which becomes an object of reflection glare. The second graphical image data, which is obtained by this second video image capture device, is used to correct a general video image and eliminate the influence of a reflection video image, wherein the general video image is with a transmission video image that transmitted through a wind shield and also with a reflection video image by the wind shield, of a predetermined part in a vehicle room.

Embodiment 2

In Embodiment 1, there is shown an automobile use video image recording device which is provided with a first video image capture device 10, which obtains the first graphical image data on a general video image, wherein the general video image is with a transmission video image that transmitted through a wind shield and also with a reflection video image by the wind shield, of a predetermined part in a vehicle room; and also with a second video image capture device 20, which obtains the second graphical image data on a video image of the predetermined part in the vehicle room, which became an object of the reflection video image. In the present Embodiment 2, the function of the second video image capture device 20 is established in the first video image capture device 10, and the automobile use video image recording device is configured to switch the video image recording areas of the camera 11 of the first video image capture device 10.

Figure 5:
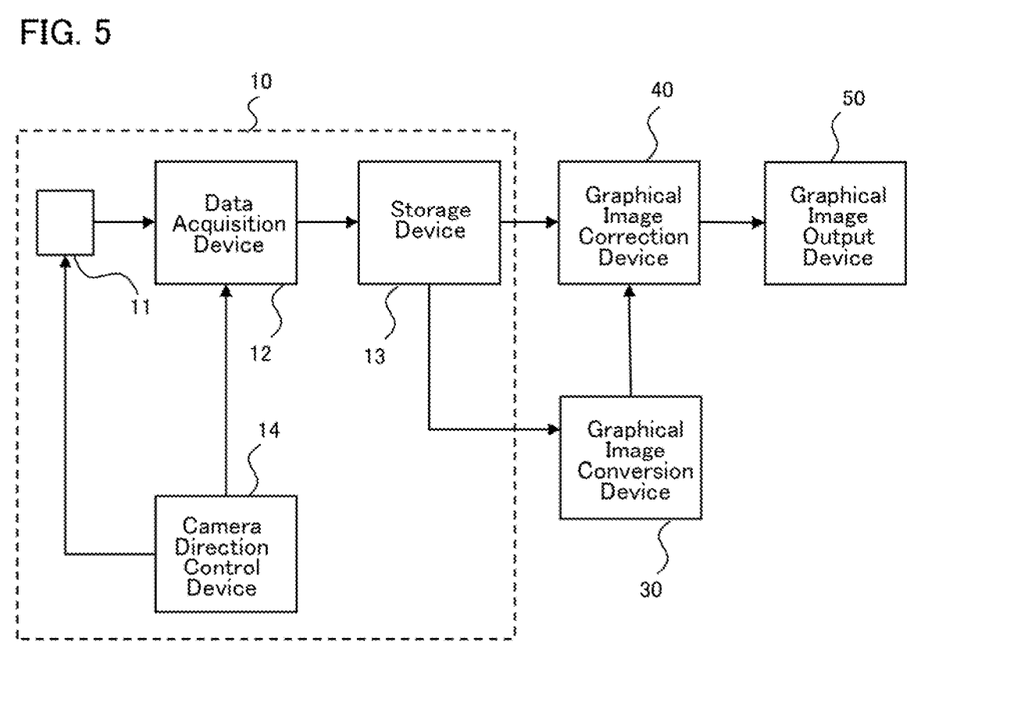
FIG. 5 is a block diagram which shows the configuration of an automobile use video image recording device according to Embodiment 2.

That is to say, the automobile use video image recording device according to Embodiment 2 is provided with a function to switch the video image recording areas of the camera 11, as shown in FIG. 5. It is to be noted that, as for the numerals in the drawings, the same numeral is given to the parts which are the same each other or correspond to each other.

As shown in FIG. 5, in order to switch the video image recording areas of the camera 11, there is provided with a camera direction control device 14. This camera direction control device 14 is configured to give an instruction for the acquisition of a general video image (the first graphical image data), to a data acquisition device 12, in the case where the video image recording area of the camera 11 is set up in a direction to obtain a general video image; and to give an instruction for the acquisition of the graphical image data on a reflection object (the second graphical image data), in the case where the video image recording area of the camera 11 is set up in a direction to record the video image of a predetermined part in a vehicle room, wherein the predetermined part became an object of the reflection video image.

Further, the storage device 13 is set up so that, the first graphical image data and the second graphical image data are each stored in a different storage sector. Like in Embodiment 1, the second graphical image data is taken out from the storage device 13, and converted into a graphical image data corresponding to a reflection video image (the third graphical image data), in the graphical image conversion device 30. Then, in the graphical image correction device 40, correction is performed on the first graphical image data which is taken out from the storage device 13, based on the third graphical image data. Then, the first graphical image data which is corrected based on the third graphical image data (the first graphical image data after the correction) is output to the graphical image output device 50.

Figure 6:
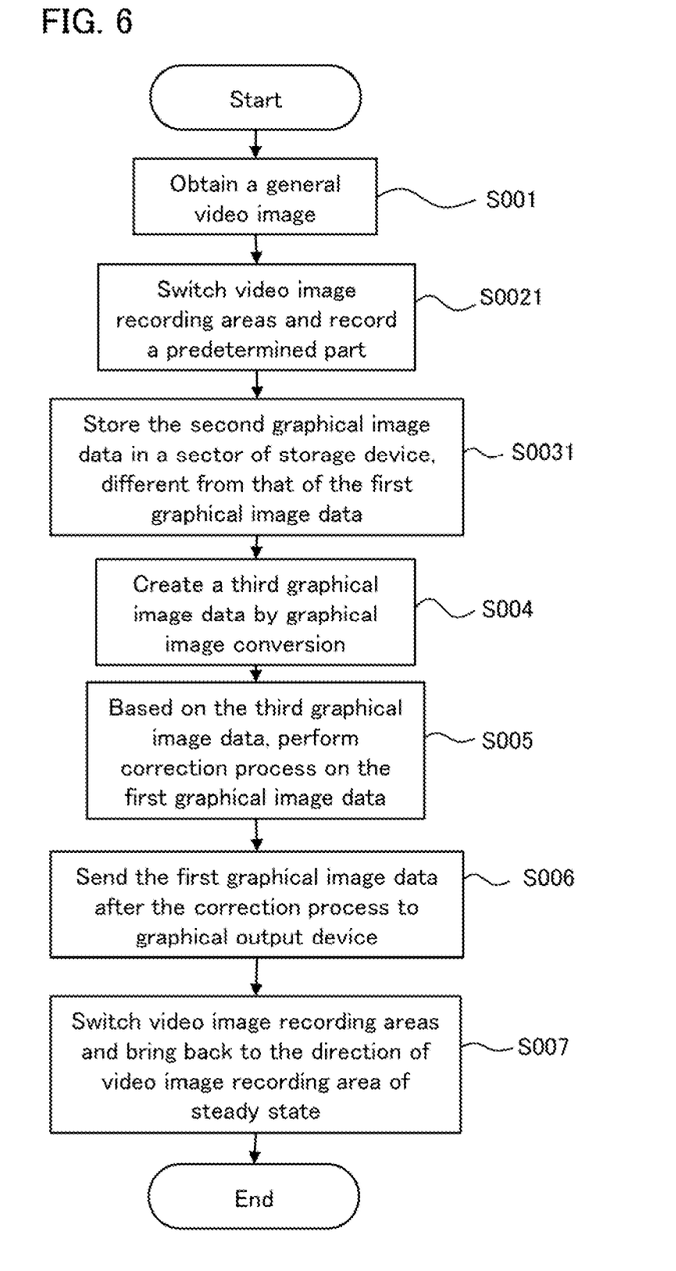
FIG. 6 is a flow chart which shows the operation of the automobile use video image recording device according to Embodiment 2.

Next, the operation of an automobile use video image recording device which is shown in FIG. 5 is represented on a flow chart, shown in FIG. 6.

At first, the graphical image data on a general video image (the first graphical image data on a general video image, wherein the general video image is with a transmission video image that transmitted through a wind shield and also with a reflection video image by the wind shield, of a predetermined part in a vehicle room) is obtained with the camera 11, in the first video image capture device 10 (Step S001). In the case where the present device is attached to, for example, a front wind shield of a vehicle, the first graphical image data which is obtained here is on a general video image, wherein the general video image is with a video image of the scenery ahead, including an object to which attention on the contact or collision along the travelling direction of the vehicle should be paid, and also with a reflection video image in a vehicle room. These situations are the same as those in Embodiment 1.

Next, the video image recording areas of the camera 11 are switched by the camera direction control device 14, and a video image of a predetermined part which became an object of a reflection video image, is recorded (Step S0021). The graphical image data on the video image which is recorded here is put in a sector different from that of the first graphical image data, and is stored, as a second graphical image data, in the storage device 13 (Step S0031).

The video image recording areas of the camera 11 are switched, and a second graphical image data is obtained. Graphical image conversion is performed on the second graphical image data, so that the second graphical image data may become a video image which corresponds to a reflection image by a wind shield. Thereby, a third graphical image data which has a huge similarity to a part of the first graphical image data will be created (Step S004).

Furthermore, the first graphical image data which is obtained here is sent to a graphical image correction device 40. In the graphical image correction device 40, a third graphical image data from the graphical image conversion device 30 is read in, and the correction process by graphical image processing is performed on a corresponding part of the first graphical image data, based on the third graphical image data (Step S005). This correction process (Step S005) and the output to the graphical image output device 50 (Step S006) are the same as those in Embodiment 1.

According to the present Embodiment 2, the direction of the camera 11 needs to be brought back to the video image recording area of a steady state at the final step, that is to say, an operation to change the video image recording direction is added, so that the video image recording area may direct the forward part of a vehicle, from an on-dashboard part (Step S007).

Figure 7:
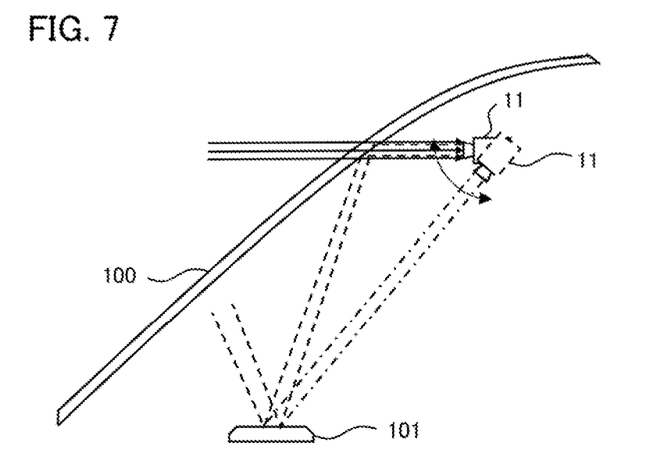
FIG. 7 is a configuration diagram for showing an exemplary installation of the automobile use video image recording device according to Embodiment 2.

FIG. 7 is a configuration diagram for showing an exemplary installation of the automobile use video image recording device according to the present Embodiment 2. In this FIG. 7, shown is a configuration which is viewed from the side face thereof, in which a front wind shield 100 of a vehicle and a dashboard part 101 that becomes an object of reflection glare are included. As shown in this FIG. 7, a camera 11 of the first video image capture device 10 is attached so as to record the video image of a scene ahead of a vehicle, through the front wind shield 100. Then, the video image recording areas are switched based on the command of the camera direction control device 14, so that the camera 11 may record the video image of a dashboard part 101, which becomes an object of reflection glare. The second graphical image data, which is obtained by recording the video image of the dashboard part 101, is used to perform the correction on a general video image and to eliminate the influence of a reflection video image, wherein the general video image is with a transmission video image that transmitted through a wind shield and also with a reflection video image by the wind shield, of a predetermined part in a vehicle room. It is to be noted that, there is shown in FIG. 7 a configuration in which directions of a camera are changed mechanically, for ease of understanding. However, in a practical case, it becomes unnecessary to change the body angle of a camera itself, when a direction change system is constructed by combining lens systems.

Embodiment 3

The function of the second video image capture device 20 is established in the first video image capture device 10, and thereby, the automobile use video image recording device is configured to switch the video image recording areas of the camera 11 of the first video image capture device 10. As for the switching in this video image recording area, shown is a case in which a switching device of optical systems is used.

Figure 8:
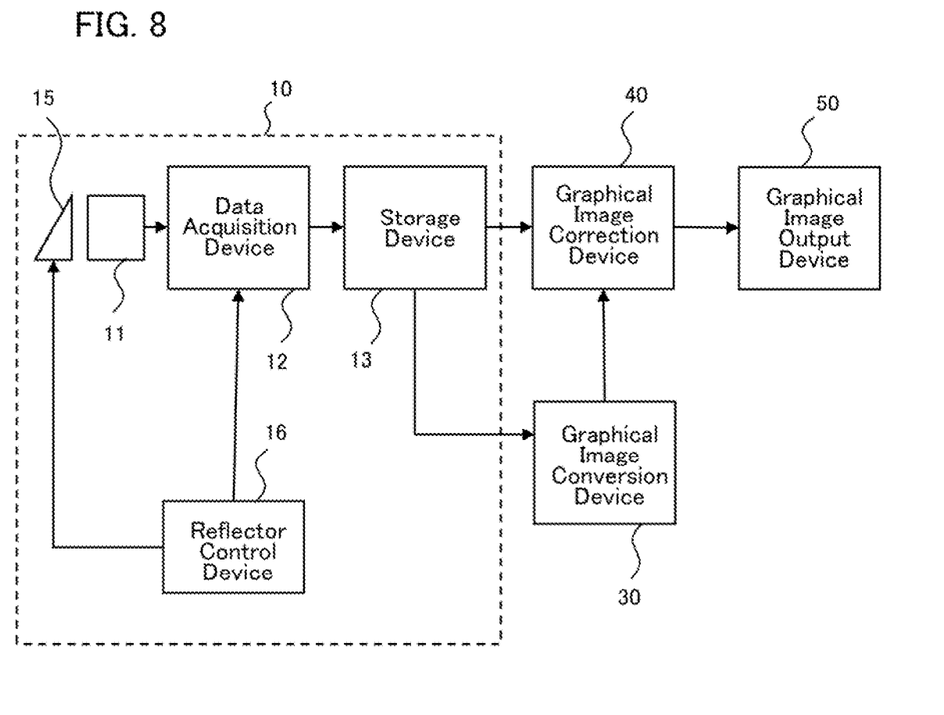
FIG. 8 is a block diagram which shows the configuration of an automobile use video image recording device according to Embodiment 3.

That is to say, as shown in FIG. 8, the automobile use video image recording device according to Embodiment 3 is provided with a reflector 15, as a function for switching the video image recording areas of the camera 11, and the automobile use video image recording device is configured so that the reflector 15 can be disposed in the video image recording area of the camera 11, on a when needed basis. It is to be noted that, as for the numerals in the drawing, the same numeral is given to the parts which are the same each other or correspond to each other.

As shown in FIG. 8, a reflector 15 is disposed in front of the camera 11, in order to switch the video image recording areas of the camera 11. In the case where the reflector 15 is disposed on an optical path, the first video image capture device is set up so that the video image recording area of the camera 11 may become a predetermined part in a vehicle room, which became an object of a reflection video image. The operation for inserting this reflector 15 is controlled by the reflector control device 16.

The relation between the insertion of the reflector 15 and the reflector control device 16, which is shown in this FIG. 8, is equal to the relation between the directional control of the camera 11 and the camera direction control device 14, which is shown in FIG. 5. Therefore, the operational flow charts in Embodiment 2 and Embodiment 3 become equivalent.

Figure 9:
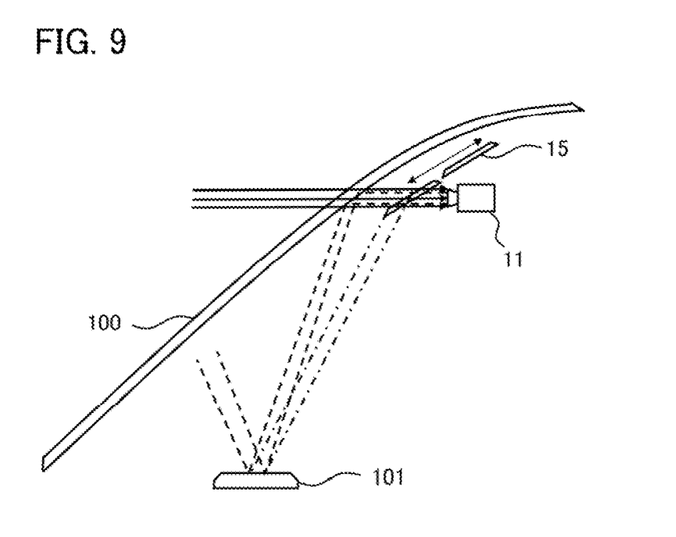
FIG. 9 is a configuration diagram for showing an exemplary installation of the automobile use video image recording device according to Embodiment 3.

FIG. 9 is a configuration diagram for showing an exemplary installation of the automobile use video image recording device according to the present Embodiment 3. In this FIG. 9, there is shown a configuration which is viewed from the side face thereof, in which a front wind shield 100 of a vehicle and a dashboard part 101 that becomes an object of reflection glare are included. As shown in this FIG. 9, a camera 11 of the first video image capture device 10 is attached so as to record the video image of a scene ahead of a vehicle, through the front wind shield 100. Then, as shown by the arrow in the drawing, the reflector 15 is inserted in front of the camera 11, based on the command of the reflector control device 16, and thereby, switching is performed so that the video image recording area with the camera 11 may become a dashboard part 101 which becomes an object of reflection glare. In the case where the reflector 15 is not inserted, the first video image capture device is configured so as to obtain a general video image.

According to the present Embodiment 3, there is no need to change the position of a camera 11, and an additional component is only a reflector 15, and thereby, a simple configuration is achieved. Further, in the case where the reflector 15 is made from a device which is provided with a shutter function, like a liquid crystal display panel, an effect will be produced that a mechanical structure can be replaced with an electric fixing device.

Embodiment 4

In Embodiment 1, there is shown a configuration in which the first graphical image data is obtained by the first video image capture device 10, and the second graphical image data is obtained by the second video image capture device 20. Further, in Embodiment 2, there is shown a configuration in which the direction of the camera 11 is switched, as a configuration in which the function of the first video image capture device 10 and the function of the second video image capture device 20 are achieved by the first video image capture device 10. Further, in Embodiment 3, there is shown a configuration in which a reflector 15 is provided in front of the camera 11 and the motion of the reflector 15 is controlled, as a configuration in which the function of the first video image capture device 10 and the function of the second video image capture device 20 are achieved by the first video image capture device 10. In this Embodiment 4, as a configuration in which the function of the first video image capture device 10 and the function of second video image capture device 20 are achieved by the first video image capture device 10, there is shown a configuration in which a wide angle camera 17 is employed as the camera 11 of the first video image capture device 10. With this wide angle camera 17, the first video image capture device is configured so that a general video image and a predetermined part in a vehicle room, which became an object of a reflection video image, can be recorded at the same time.

Figure 10:
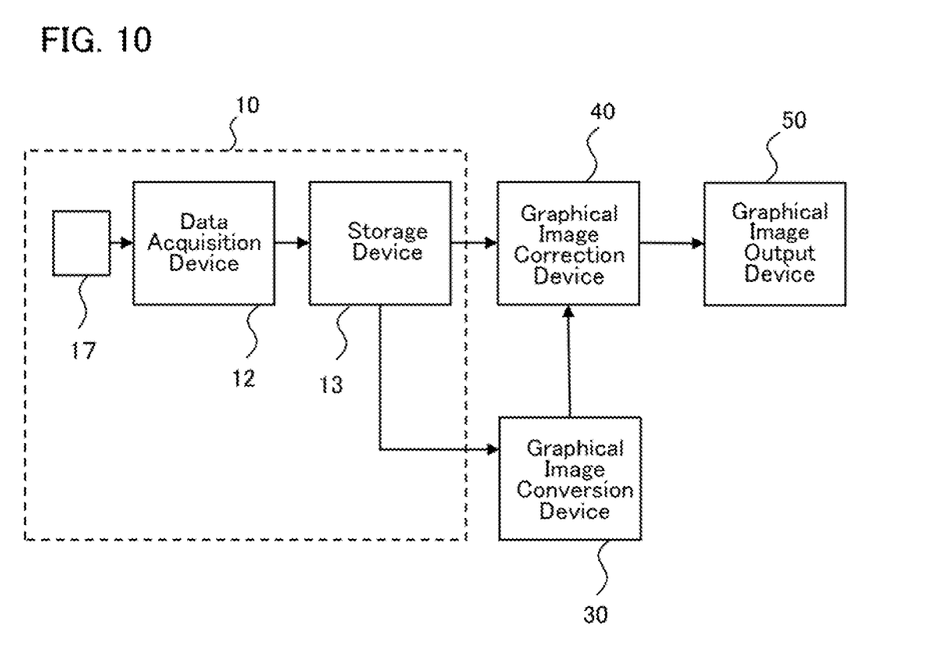
FIG. 10 is a block diagram which shows the configuration of an automobile use video image recording device according to Embodiment 4.

That is to say, the configuration of an automobile use video image recording device according to Embodiment 4 is shown as a block diagram in FIG. 10, and the automobile use video image recording device is designed so that the first graphical image data and the second graphical image data can be obtained at the same time, with the use of a wide angle camera 17. The obtained first graphical image data and second graphical image data are sorted out according to their video image recording areas, and respective graphical image data are divided to clip parts of the video images. After those respective data are stored in the storage device 13, processing is allowed to be performed in the graphical image conversion device 30 and the graphical image correction device 40.

By recording a video image with the wide angle camera 17 and performing graphical image processing, different graphical image data can be processed at the same time, and thereby, the processing can be performed in a shortened time, and, in addition, recording of a video image is performed always on a predetermined part in a vehicle room, which became an object of a reflection video image. Therefore, an effect will be produced that the present embodiment can follow the change of the predetermined part in a vehicle room, like in the case where the first video image capture device 10 and the second video image capture device 20 are provided with.

Embodiment 5

In Embodiment 5, by the use of a first video image capture device 10 which obtains the first graphical image data on a general video image, wherein the general video image is with a transmission video image that transmitted through a wind shield and also with a reflection video image by the wind shield, of a predetermined part in a vehicle room, an automobile use video image recording device obtains a general video image and a reflection video image, with the division being maintained between the two. Further, correction is performed on the graphical image data on a general video image (the first graphical image data), so that influence of the graphical image data on a reflection video image (the third graphical image data) may be reduced. Thus, in obtaining the graphical image data on a reflection video image (the third graphical image data), the automobile use video image recording device is configured to obtain a graphical image data on a reflection video image, using the partially masked state of a general video image, by the motion of a wiper, which moves and rotates on the outside of a wind shield (the outdoor side of a vehicle).

Figure 11:
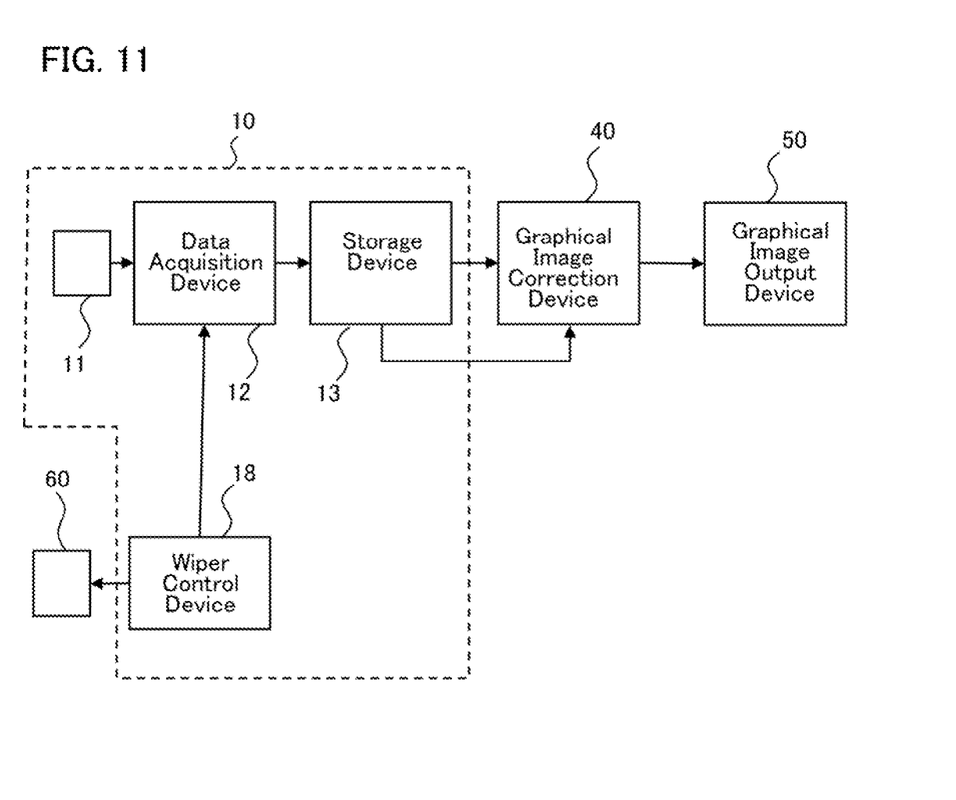
FIG. 11 is a block diagram which shows the configuration of an automobile use video image recording device according to Embodiment 5.

As shown in FIG. 11, the automobile use video image recording device according to Embodiment 5 is provided with a first video image capture device 10, which obtains the first graphical image data on a general video image, wherein the general video image is with a transmission video image that transmitted through a wind shield and also with a reflection video image by the wind shield, of a predetermined part in a vehicle room, and also the graphical image data on a reflection video image which is reflected on the surface of the wind shield (the third graphical image data). This first video image capture device 10 is provided with a camera, a data acquisition device 12, a storage device 13, and a wiper control device 18 which controls so as to establish a link between the motion of an existing wiper 60 and the operation of the data acquisition device 12.

By the use of this first video image capture device 10, obtained are a first graphical image data on a general video image, wherein the general video image is with a transmission video image that transmitted through a wind shield and also with a reflection video image by the wind shield, of a predetermined part in a vehicle room, and a graphical image data on a reflection video image (third graphical image data), wherein the reflection video image is produced by the reflection on the surface of the wind shield, when the general video image is interrupted by the wiper 60. Then, the first video image capture device 10 stores the first graphical image data and the third graphical image data in the storage device 13, with the division being maintained between the two.

Furthermore, the first video image capture device 10 is connected to a graphical image correction device 40. Based on the third graphical image data, the graphical image correction device 40 performs the correction on the first graphical image data which is taken out from the storage device 13. Then, the first graphical image data which is corrected based on the third graphical image data (the first graphical image data after the correction) is output to the graphical image output device 50, and a video image in which a reflection video image is eliminated from the general video image, can be provided as an output of the automobile use video image recording device.

Figure 12:
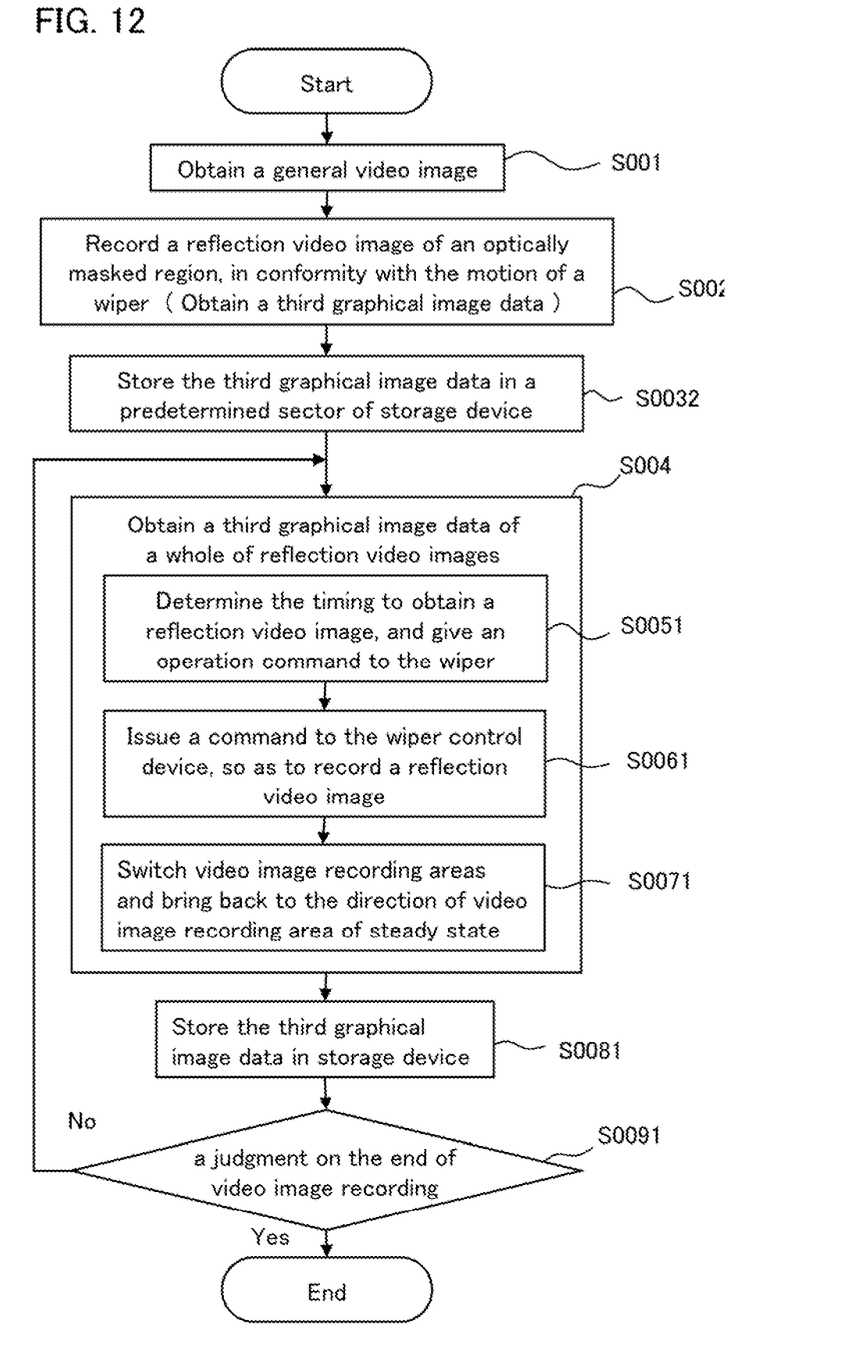
FIG. 12 is a flow chart which shows the operation of the automobile use video image recording device according to Embodiment 5.

Operations of the automobile use video image recording device according to Embodiment 5 follow a diagram which is shown in FIG. 12.

At first, in the first video image capture device 10, the graphical image data on a general video image (the first graphical image data on a general video image, wherein the general video image is with a transmission video image which transmitted through a wind shield and also with a reflection video image by the wind shield, of a predetermined part in a vehicle room) is obtained with the camera 11 (Step S001). In the case where the present device is attached to, for example, a front wind shield of a vehicle, the first graphical image data which is obtained here, is on a general video image, wherein the general video image is with a video image of the scenery ahead, including an object to which attention on the contact or collision along the travelling direction of a vehicle should be paid, and also with a reflection video image in a vehicle room. The graphical image data which is obtained here (the first graphical image data) will be stored in a predetermined sector of the storage device 13.

Next, with the camera 11 of the first video image capture device 10, a reflection video image is recorded in conformity with the motion of a wiper 60, with respect to a region which is masked optically by the wiper 60 (Step S0021). The graphical image data on a video image which is recorded here is stored in a predetermined sector of the storage device 13, as a third graphical image data (Step S0032).

The third graphical image data which is to be stored in the storage device 13, is accumulated sequentially, in accordance with the motion of the wiper 60, and the whole of video images which are reflected by a wind shield can be obtained by tying them together (Step S004).

With regard to a timing for the acquisition of the graphical image data on a reflection video image (the third graphical image data), the wiper control device 18 is in charge. In the case where the wiper control device determines that it is the timing to obtain a graphical image data on a reflection video image, the wiper control device 18 gives an operation command to the wiper 60 (Step S0051).

When the wiper 60 receives an operation command, the wiper will move to a video image recording area of the camera 11 of the first video image capture device 10, according to the command, and thereby, a partial black background will be generated. After that, the wiper control device 18 issues a command to the data acquisition device 12, so as to record a reflection video image (Step S0061).

In a state where this partial black colored background is generated, the data acquisition device 12 obtains a forward part graphical image data in the partial black background generation state (first graphical image data), in other words, a forward part graphical image data which includes a part of the reflection glared graphical image (Step S0071). Then, the graphical image data on the obtained reflection video image will be stored in the storage device 13 (Step S0081).

After that, the wiper 60 moves, and the recording of a video image is carried out again. That is to say, the processing in Step S0051 to Step S0081 will be repeated, according to the change in the position of the wiper 60. This repetition will be performed until a judgment on the end of video image recording (Step S0091) is made by the wiper control device 18. The judgment on the end of video image recording is made when the partial black backgrounds which are generated by the wiper 60 cover the whole of video image capture range. That is, suppose that a plurality of recorded partial black background graphical images are clipped out and combined together. When one sheet of the whole black background graphical images which extends all over the video image capture range, in other words, when the whole of reflection video images are obtained, the wiper control device 18 judges that it is the time to end the recording of a video image.

Embodiment 6

In Embodiment 6, explanation will be made about the configuration of an automobile use graphical image recognition device, in the case where automobile use video image recording devices which are shown in Embodiments 1 to 5 are employed to utilize as the automobile use graphical image recognition device.

Figure 13:
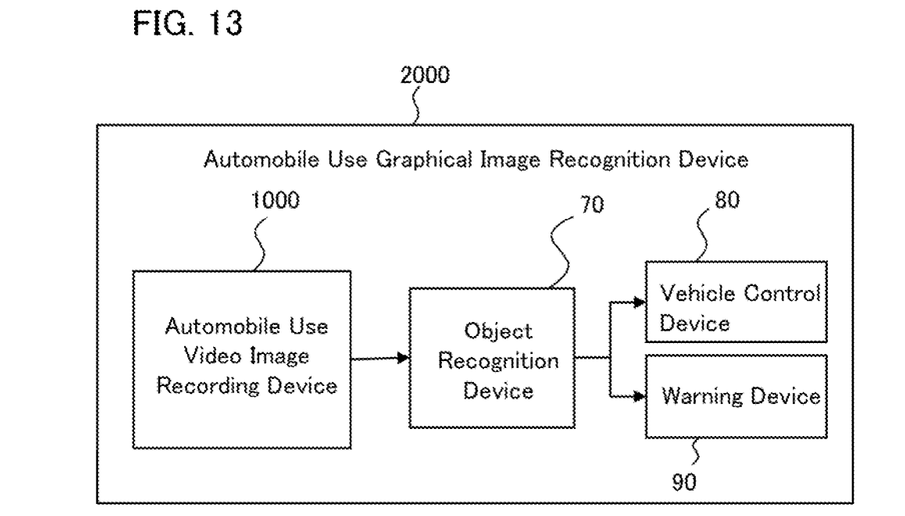
FIG. 13 is a block diagram which shows the configuration of a graphical image recognition device according to Embodiment 6.

FIG. 13 shows a configuration of an automobile use graphical image recognition device 2000, which uses an automobile use video image recording device 1000. This automobile use graphical image recognition device 2000 is provided with an object recognition device 70, a vehicle control device 80, and a warning device 90.

The object recognition device 70 is provided with reference information for making a comparative review on the shape of an object, and is the one to compare provided graphical image information with the holding reference information, and judge an object which is coincident with the provided graphical image. The automobile use video image recording device 1000 is connected to this object recognition device 70, and provides graphical image information (graphical image data), whose output information is corrected, so that influence of a reflection video image may be reduced. For the reason above, errors in graphical image recognition are decreased, and the automobile use video image recording device 1000 will be used effectively.

The vehicle control device 80 controls the motion of a vehicle, based on the recognition result by the object recognition device 70. Further, the warning device 90 is the one to issue a warning on a when needed basis, based on the recognition result by the object recognition device 70.

In more precise words, in the object recognition device 70, owned is graphical image information, on the shape of various persons, the shape of animals, the shape of vehicles, and the shape of various fixtures provided on a road. The object recognition device 70 compares the holding graphical image information (the reference information) and the graphical image information provided from the automobile use video image recording device 1000 (the graphical image data), and judges what the graphical image data, which appears in the automobile use video image recording device 1000, corresponds to. Based on the judgement result, the object recognition device 70 performs the control of a vehicle by the vehicle control device 80, or the warning by the warning device 90.

In the case where the above mentioned control of a vehicle or warning is performed based on a graphical image data, a mistaken result is brought, when a graphical image data by a reflection glare is contained in the graphical image data. In particular, mistaken guidance will be conducted, in the case where learning effect by the graphical image data is expected, However, errors in the graphical image recognition can be prevented, by reducing the influence of a reflection video image, like in this Embodiment 6.

Figure 14:
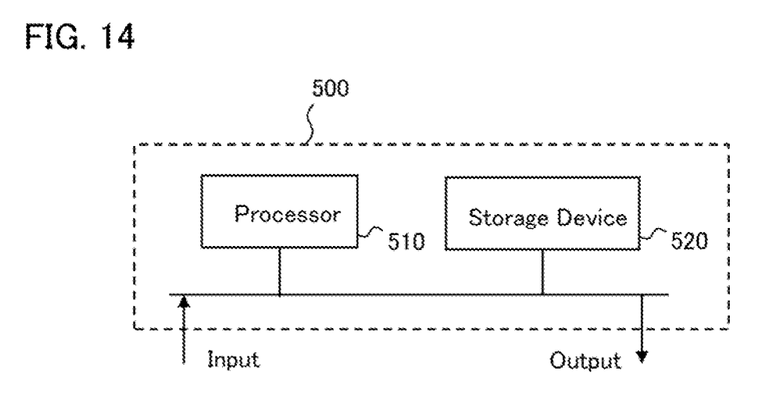
FIG. 14 is a block diagram which shows the configuration of a control device used in the embodiments.

It is to be noted that, the automobile use video image recording devices according to Embodiments 1-5 and the automobile use graphical image device according to Embodiment 6 are conducted by a control device 500 which is constructed with a processor 510 and a storage device 520, as shown in FIG. 14. Further, although the embodiments show devices of an individual mode, those devices are accepted which can perform respective functions. Furthermore, although the contents of the storage device 520 are not shown in the drawing, the storage device is provided with volatile storage devices, such as random access memories, and nonvolatile auxiliary memory devices, such as flash memories. Further, the storage device may be provided with an auxiliary memory device of hard disk type, instead of the flash memory. The processor 510 executes a program which is input from the storage device 520. In this case, the program is input into the processor 510, via the volatile storage device, from the auxiliary memory device. Further, the processor 510 may output the data of calculated results and the like, to the volatile storage device of the storage device 520, and may store the data, via a volatile storage device, in an auxiliary memory device.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

EXPLANATION OF NUMERALS AND SYMBOLS

10 First video image capture device, 11 Camera, 12 Data acquisition device, 13 Storage device, 14 Camera direction control device, 15 Reflector, 16 Reflector control device, 17 Wide angle camera, 18 Wiper control device, 20 Second video image capture device, 21 Camera, 22 Data acquisition device, 23 Storage device, 30 Graphical image conversion device, 40 Graphical image correction device, 50 Graphical image output device, 60 Wiper, 70 Object recognition device, 80 Vehicle control device, 90 Warning device, 100 Front wind shield, 101 Dashboard part, 500 Control device, 510 Processor, 520 Storage device, 1000 Automobile use video image recording device, 2000 Automobile use graphical image recognition device

What is claimed is:

1. An automobile use video image recording device, comprising:
   at least one camera configured to obtain a first graphical image including a reflection video image of a predetermined internal part of a vehicle that is reflected onto the windshield, by capturing a front view of the vehicle through the windshield of the vehicle via the at least one camera that faces the windshield of the vehicle, and obtain a second graphical image by directly capturing a view of a predetermined internal part of the vehicle via the at least one camera that faces the predetermined internal part of the vehicle, that is an object of the reflection video image; and
   one or more processors configured to convert the second graphic image into a third image that corresponds to the video image of the object, obtained when reflected by the windshield, and correct the first graphic image based on the third graphical image,
   wherein the first graphical image is corrected to delete the reflection video image of the predetermined internal part of the vehicle.

2. The automobile use video image recording device according to claim 1,
   wherein the least one camera includes a first camera which obtains the first graphical image, and a second camera which obtains the second graphical image.

3. The automobile use video image recording device according to claim 1,
   wherein the at least one camera is configured to rotate to change a camera direction between a first video image recording direction for obtaining the first graphical image and a second video image recording direction for obtaining the second graphical image.

4. The automobile use video image recording device according to claim 1,
   further comprising a reflector that is disposed between the windshield and the at least camera, and is configured to switch video image recording directions and obtain the first graphical image and the second graphical image, by intervention of the reflector.

5. The automobile use video image recording device according to claim 1,
   wherein the at least one camera includes a wide angle camera, and is configured to include a first video image recording area for obtaining the first graphical image and a second video image recording area for obtaining the second graphical image, at the same time.

6. The automobile use video image recording device of claim 1, wherein the one or more processors are further configured to:
   recognize the predetermined internal part in the first graphical image, as an area to be corrected based the predetermined internal part in the directly captured image.

7. An automobile use graphical image recognition device, comprising;
   the automobile use video recording device according to claim 1, and
   wherein the one or more processors are further configured to recognize an object corresponding to graphical image information, provided from the automobile use video recording device.

8. An automobile use graphical image recognition device, comprising;
   the automobile use video image capture device according to claim 2, and
   wherein the one or more processors are further configured to recognize an object corresponding to graphical image information, provided from the automobile use video image capture device.

9. An automobile use graphical image recognition device, comprising;
   the automobile use video image capture device according to claim 3, and
   wherein the one or more processors are further configured to recognize an object corresponding to graphical image information, provided from the automobile use video image capture device.

10. An automobile use graphical image recognition device, comprising;
- the automobile use video image capture device according to claim 4, and
- wherein the one or more processors are further configured to recognize an object corresponding to graphical image information, provided from the automobile use video image capture device.

11. An automobile use graphical image recognition device, comprising;
- the automobile use video image capture device according to claim 5, and
- wherein the one or more processors are further configured to recognize an object corresponding to graphical image information, provided from the automobile use video image capture device.

12. An automobile use video image recording device, comprising:
- at least one camera which obtains a first graphical image data on a general video image, wherein the general video image is with a reflection video image by a wind shield, of a predetermined part in a vehicle room and also with a transmission video image that transmitted through the wind shield, and also a third graphical image data on the reflection video image, at a time when the general video image is masked by a wiper, which moves and rotates on an outside of the wind shield, and
- at least one processor which corrects the first graphical image data based on the third graphical image data.

13. An automobile use graphical image recognition device, comprising;
- the automobile use video image capture device according to claim 12, and
- wherein the one or more processors are further configured to recognize an object corresponding to graphical image information, provided from the automobile use video image capture device.

14. An automobile use video image recording device, comprising:
- at least one camera configured to obtain a general video image by capturing a front view of a vehicle through a windshield of the vehicle, and a reflection of a predetermined internal part of the vehicle that is reflected onto the windshield, and obtain a reflection video image by capturing an area of the windshield where a wiper is located on the windshield, at a time when the wiper is moving and is placed in a field of view of the general video image; and
- at least one processor configured to:
  - send an operation command to the wiper to cause the wiper to move to the area in the field of view of the general video image, when the at least one camera captures the reflection video image, and
  - correct the general video image based on the reflection video image.

* * * * *